Oct. 29, 1963 H. E. MELTZER 3,109,083
HEAT BLOW GUN WITH SCRAPER
Filed Oct. 19, 1960 3 Sheets-Sheet 1

INVENTORS
HENRY E. MELTZER
BY
*Wright & Wright*
ATTORNEYS

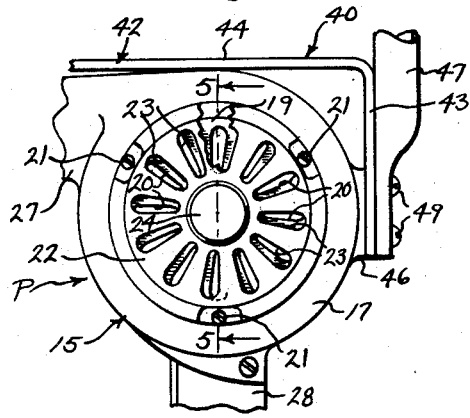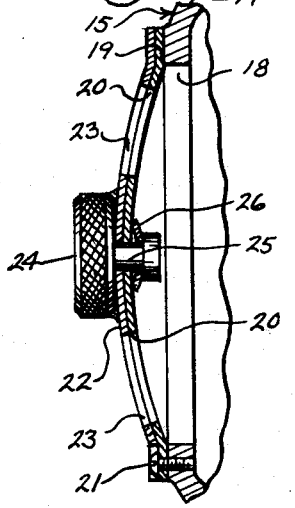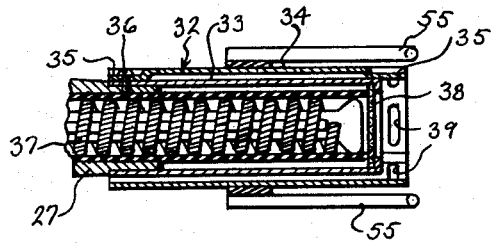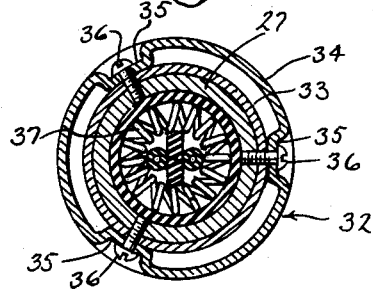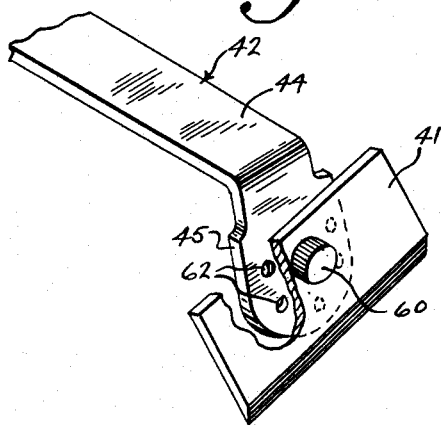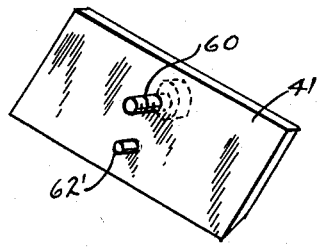

Oct. 29, 1963  H. E. MELTZER  3,109,083
HEAT BLOW GUN WITH SCRAPER
Filed Oct. 19, 1960  3 Sheets-Sheet 3
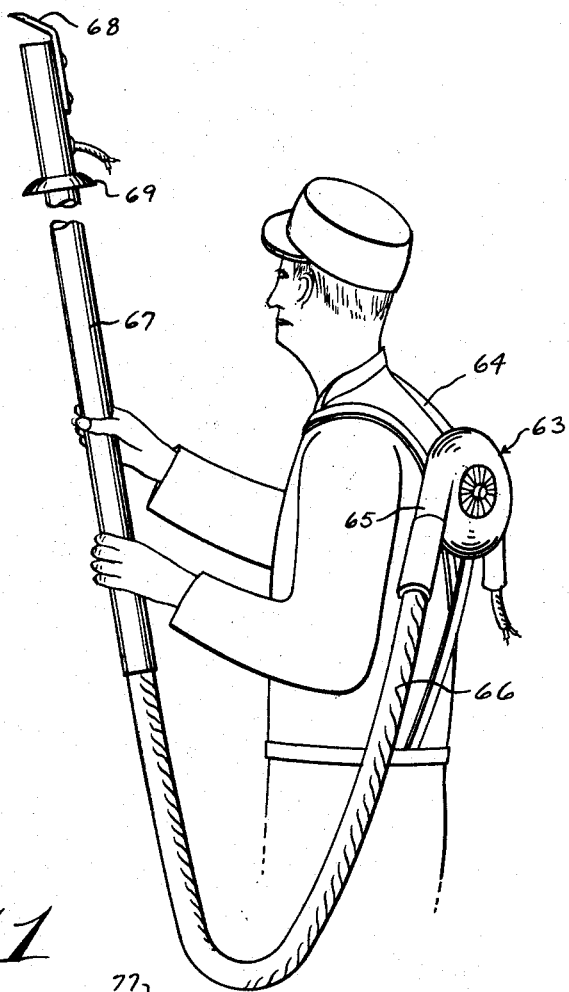
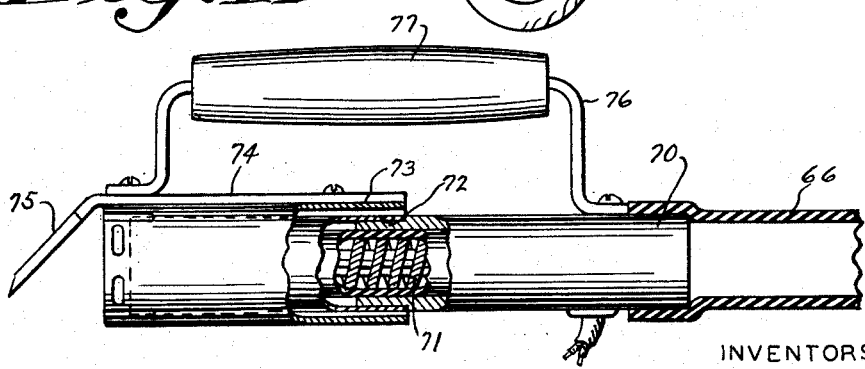
INVENTORS
HENRY E. MELTZER
BY *Wright Wright*
ATTORNEYS

United States Patent Office 3,109,083
Patented Oct. 29, 1963

3,109,083
HEAT BLOW GUN WITH SCRAPER
Henry E. Meltzer, Racine, Wis., assignor to Master
Appliance Corporation, Racine, Wis.
Filed Oct. 19, 1960, Ser. No. 63,649
6 Claims. (Cl. 219—39)

This invention appertains to a novel device for removing paint and the like from a surface, and more particularly to novel means for heating the paint and the scraper blade employed for removing the paint.

One of the salient objects of my invention is to provide a paint scraper embodying a scraper blade carried directly by the outlet nozzle of a heat blow gun, so that as the paint is softened by the hot air emanating from the nozzle, the blade can effectively and easily remove the paint.

Another important object of the invention is to provide a combination scraper blade and heat blow gun, so that paint can be simultaneously softened and removed with one operation.

A further object of the invention is to provide a novel arrangement of the scraper blade relative to the nozzle, whereby the blade is positioned directly in front of the hot air stream as the same leaves the nozzle, so that the blade will be maintained at a desired high temperature for effectively removing paint, the position of the blade being such as to also direct the heated air down on the paint to heat the same, and thus decrease the time element in removing old paint.

Another further object of my invention is to provide a paint scraper embodying a motor driven air impeller and a nozzle having connection with the air discharge of the impeller, the nozzle having located directly therein and in the path of the air an electric heating element of the desired rating for raising the temperature of the air flowing through the nozzle to a selected high degree, the nozzle in turn carrying at its outlet end an angularly disposed paint scraping blade.

A further important object of the invention is to provide a novel nozzle construction including a heat protecting sleeve disposed around the nozzle and spaced therefrom so that hot air around the nozzle can be dissipated to the atmosphere at the front and rear thereof.

Another further important object of my invention is to provide novel adjustable means for regulating the flow of air into the impeller casing, whereby the amount of air and consequently, the temperature thereof flowing out of the nozzle can be controlled.

A still further object of my invention is to provide means for quickly adjusting the scraper blade to any desired angle relative to the nozzle which would be best suited for a certain type of work or surface, and guard means located on opposite sides of the blades and nozzle for protecting the nozzle against injury incident to possible contact with the work.

A still further important object of the invention is to provide a novel handle arrangement for the paint scraper, whereby a desired pressure can be easily maintained on the scraper blade without fatigue on the part of the operator and without undue strain on the motor and impeller casing.

A still further important object of my invention is to provide a paint scraper which will be light in weight for carrying directly in the hand, or one in which the motor and air impeller casing can be strapped to the back of a worker with an elongated nozzle wand carrying the scraper blade, and electric heating element at its outer end, the wand being connected to the outlet of the impeller by a flexible hose, whereby both hands of the operator will be free for manipulating the nozzle wand and scraper for high or overhead work.

With these and other objects in view, the invention consists in the novel construction, arrangement and formation of parts, as will be hereinafter more specifically described and claimed, and illustrated in the accompanying drawings, in which drawings FIGURE 1 is a side elevational view of my novel combination heat gun and paint scraper;

FIGURE 4 is a fragmentary side elevational view of my improved heat blow gun and paint scrapper looking from the opposite side from FIGURE 1, the view illustrating the novel means for controlling the in-flow of air to the impeller;

FIGURE 5 is an enlarged fragmentary detail sectional view taken on the line 5—5 of FIGURE 4, looking in the direction of the arrows, illustrating the air control;

FIGURE 6 is a fragmentary longitudinal sectional view through the nozzle of the heat gun taken on the line 6—6 of FIGURE 1, looking in the direction of the arrows, the view illustrating the heat protecting sleeve and the guards for the nozzle;

FIGURE 7 is an enlarged transverse sectional view through the nozzle taken on the line 7—7 of FIGURE 1, looking in the direction of the arrows, the view also illustrating the heat protecting sleeve;

FIGURE 8 is a detail fragmentary perspective view illustrating the paint scraper blade and its support and the means for adjusting the same to different angles;

FIGURE 9 is a detail perspective view of the scraper blade per se and showing the rear face thereof;

FIGURE 10 is a perspective view illustrating a further form of the heat gun and paint scraper, and FIGURE 11 is a fragmentary side elevational view illustrating a hand operated nozzle and scraper for use with that form of my invention shown in FIGURE 10, parts of the figure being shown broken away and in section.

Figure 1:
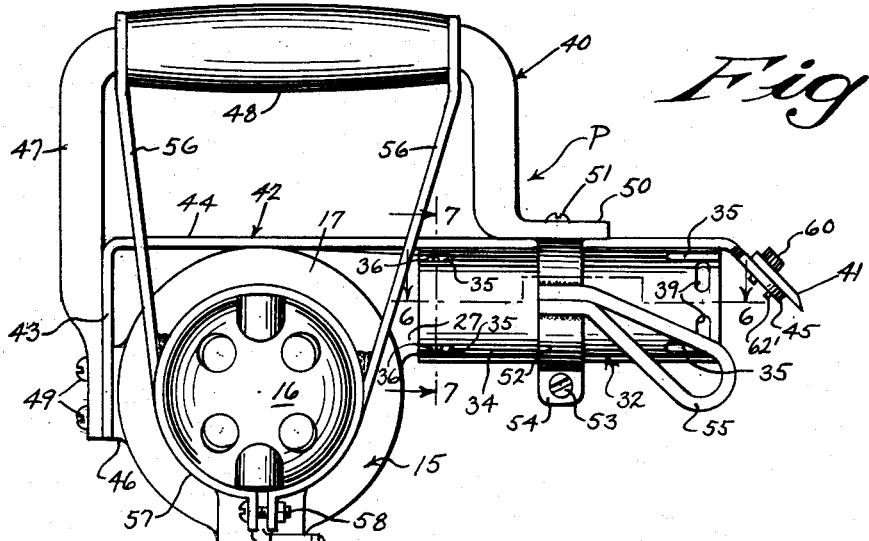
Figure 2:
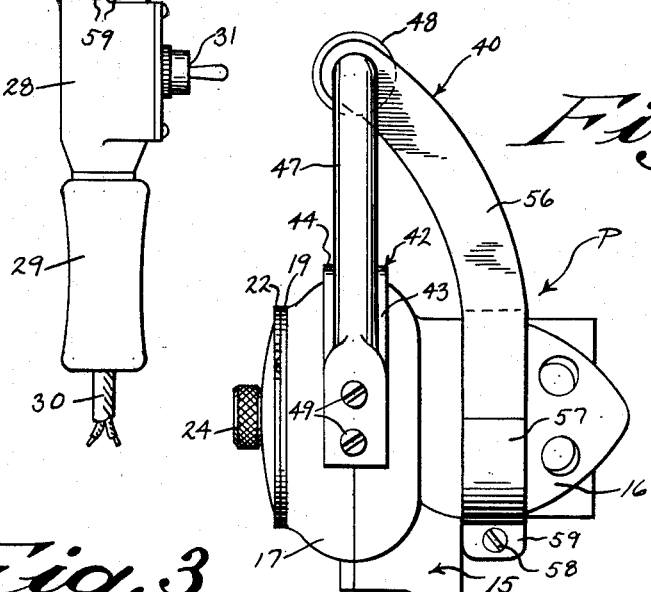
FIGURE 2 is a rear elevational view thereof.

Referring to the drawings in detail, wherein similar reference characters designate corresponding parts throughout the several views, the letter P generally indicates my improved paint scraper and the same includes a body 15, preferably, but not necessarily, in the form of a casting. The body 15, as illustrated, includes a motor casing section 16 and an air impeller section 17.

As in the usual construction of devices of this kind (hand hair dryers etc.), the electric motor (not shown) is housed within the casing 16 and drives the impeller wheel (not shown) disposed in the casing 17 and the impeller wheel is connected directly to the armature shaft of the motor. The outer side of the impeller casing 17 is provided with a large centrally disposed air intake opening 18 and this opening is covered by a concavo-convex shaped plate 19. The plate 19 has formed therein elongated air inlet slots 20 and these slots radiate from a common axial center. The plate 19 is secured to the casing 17 in any desired way, such as by the use of machine screws 21. In accordance with my invention, I provide means for regulating the flow of air into the casing 17, and hence I provide an outer adjustable plate 22 of substantially the same shape and contour as the plate 19. The outer plate 22 also has formed therein elongated air inlet slots 23, and these slots radiate from a common axis. The outer face of the plate 22 has secured thereto an axially disposed knurled manipulating knob 24 which is threaded on a bolt 25 which extends through the axial center of the plate 19. A spring washer 26 is placed on the bolt 25 between the head thereof and the inner surface of the plate 19, so as to maintain the outer plate 22 in frictional contact with the plate 19. By turning the knob 24 the plate 22 can be turned on its bolt so as to bring the slots 23 into more or less registration with the slots 20, and by turning the outer plate the flow of air into the impeller casing can be controlled. Leading from the casing 17 and preferably at the upper end thereof is a tangentially extending air outlet head 27. The lower end of the body 15 has formed thereon a depending cylindrical stud 28 and this stud carries a hand grip 29. The electric cord 30 for the electric motor and other parts of the device, as will later appear, preferably extend through the hand grip 29 and stud 28 and into the motor casing. The stud 28 carries an electric switch 31 for opening and closing the circuit through the motor and to another part of the device.

In accordance with my invention, I secure to the air outlet head 27 an air outlet nozzle 32. This air outlet nozzle 32 includes an inner cylindrical sleeve 33 and an outer spaced cylindrical sleeve 34. The outer sleeve has struck-in therefrom, at spaced points spacing lugs 35 and screws 36 extend through these lugs and through the inner sleeve 34 and into the outlet head 27. This maintains the nozzle in place on the outlet head. Arranged within the nozzle is an electric heating element 37 and this element is electrically connected with the wiring leading to the motor, so that upon the closing of the switch 31, an electric circuit will be completed through the motor and through the electric heating element 37. The electric heating element is of such a character as to heat the air flowing through the nozzle to a high degree and to a sufficient temperature so as to soften or melt paint on a surface.

If desired a screen 38 can be placed at the front of the nozzle. The outer sleeve 34 extends forwardly of and slightly beyond the inner sleeve 33 and this portion of the outer sleeve is provided with air escape slots 39. The function of the spaced outer sleeve is to permit a circulation of air around the inner sleeve and upon the backing up of any hot air around the nozzle or around the inner sleeve 33, the same can flow out through the back end of the nozzle i.e., through the spaces between the inner and outer sleeve 33 and 34.

In conjunction with the body 15 and nozzle 32, I employ a novel handle structure 40 so constructed and arranged relative to the hand grip 29 as to permit the convenient operation of the entire tool by the two hands of an operator. The forward end of the handle structure carries a scraping blade 41, and the handle structure is such that pressure can be placed on the blade to bring about the desired scraping action without putting too much strain on the body 15. This handle structure 40 includes an inner L-shaped plate 42 having a short depending leg 43 and a forwardly extending relatively long flat leg 44. This flat leg 44 extends beyond the nozzle 32 and terminates in a downwardly and forwardly extending foot 45, which adjustably supports the paint scraping blade 41. The leg 44 extends longitudinally of the body 15 and the short leg 43 extends down the rear end of the body and against a boss 46 formed on the body.

In conjunction with the plate 42 I employ a U-shaped handle 47 and the central portion of this handle 47 carries a hand grip 48. The rear end of the handle 47 extends down over the leg 43 of the plate 42 and screws 49 extend through the rear end of the handle 47 through the leg 43 and into the boss 46. The front end of the handle is provided with an outwardly extending attaching foot 50 which rest on the upper face of the leg 44 and a screw 51 extends through the attaching foot 50 and into the leg 44. Obviously, the foot 50 can be secured to the leg 44 in any desired way, such as by spot welding. The foot also carries a split collar 52 which surrounds the nozzle and the split collar can be contracted around the nozzle and clamped thereto by adjusting a screw 53 which extends through ears 54 formed on the split collar on opposite sides of the split thereof. Welded or otherwise secured to the split collar 52 are forwardly and downwardly extending guard fingers 55 and the extreme forward ends of these guard fingers are arranged below and on opposite sides of the blade 41. These fingers function to prevent the striking of the nozzle against the work and thus prevent injury to the nozzle. It is also preferred to strengthen the connection of the handle structure 40 with the body 15 as much as possible so as to distribute strains and the like and thus laterally and downwardly extending brace bars 56 can be carried by the U-shaped handle 47 adjacent to the opposite ends of the hand grip 48. These braces 56 carry a split ring 57 which encircles the motor casing 16 and the split ring 57 is clamped around the motor casing by means of a bolt 58 which extends through ears 59 formed on the collar 57 on opposite sides of the split portion thereof. Thus, the handle structure is braced laterally, as well as longitudinally.

Figure 3:
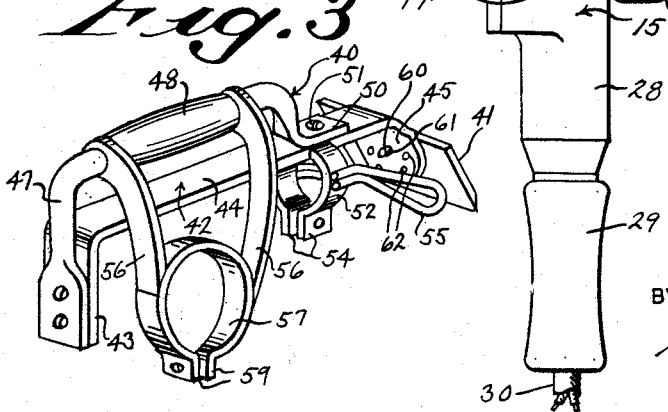
FIGURE 3 is a perspective view of my novel handle arrangement carrying the paint scraper blade removed from the heat gun.

As heretofore brought out, it is extremely desirable to have the paint scraping blade 41 adjustable on the foot 45, so that the scraping blade can be swung at different angles to suit varying working conditions. The blade 41 can be adjustably connected to the foot 45 in different manners, but as shown, the blade 41 carries a machine screw 60 which is threaded into a central opening 61 (see FIG. 3), formed in the foot 45. By loosening and tightening the screw 60 the blade can be moved to different positions. In order to hold the blade in a desired, set position against swinging movement, the foot 45 has formed therein around the central opening 61 a series of openings 62. These openings 62 are disposed around the opening 61 in a substantially annular formation. The inner face of the blade 41 carries a locating pin 62′ and this pin can be placed in any desired selected opening 62.

In operation and use of my improved tool the hand grips 29 and 48 are gripped by the operator and the circuit is closed through the motor and the electric element 37 and at this time a blast of hot air flows forcibly out through the nozzle and directly against the cutting blade 41. The temperature of the blade is raised to the desired degree of heat and the blade is placed against the paint surface to be scraped. Due to the angle position of the blade relative to the outlet nozzle of the tool, the hot air will also be directed down against the paint surface and hence the paint will be quickly softened and be removed by forcibly moving the blade over the paint.

Due to the arrangement of the hand grip 48 the desired pressure can be exerted on the blade 41 without discomfort to the operator and without undue strain on the body 15 or the nozzle 32. The guard fingers 55 effectively prevent the nozzle from being banged against the work.

Obviously, the heat gun can be used without the scraper 41 to heat any desired surface and the heat gun is especially useful in heating asphalt tile and the like, incident to the laying thereof on a surface.

While the paint scraper shown in FIGS. 1 to 9, can be effectively used on any surface, such as floors, sills, walls, ceilings and the like, I preferably provide a modified form of my device for overhead work or for commercial paint removers, and such form is shown in FIGS. 10 and 11.

As illustrated in FIG. 10, an air blower 63 can be strapped to the back of an operator by a suitable harness 64. The air outlet head 65 of the blower can have connected therewith a length of flexible hose 66. The hose 66 can have different characters of operating nozzles connected therewith. As illustrated in FIG. 10, I employ an elongated nozzle wand 67 for overhead work and the outer end of this nozzle wand has incorporated therein an electric heating element for raising the temperature of the air to a desired degree. Secured to the outlet end of the nozzle is a scraper blade 68. The scraper blade 68 is disposed at an angle in front of the outlet end of the nozzle and hence this blade becomes heated and directs the hot air against the work. As a matter of preference, a hand guard 69 can be carried by the nozzle in rear of that portion of the nozzle which carries the heating element. This prevents the hand of an operator from being inadvertently moved up over the hot air of the nozzle.

As shown in FIGURE 11 a hand manipulated nozzle 70 can be connected to the hose 66 in lieu of the wand nozzle 67. This nozzle 70 is of identically the same character as the nozzle shown in FIGS. 1 to 9. Hence, the nozzle has incorporated therein the electric resistance heating element 71. The nozzle also includes the inner and outer sleeves 72 and 73. The outer sleeve has secured thereto a plate 74 and the forward end of the plate carries a blade 75 which may or may not be adjustable. The blade 75 is also disposed directly in front of the outlet of the nozzle and in the path of the outgoing air. A U-shaped handle 76 is fastened to the nozzle and the handle carries a hand grip 77. This form of nozzle is particularly useful for close work.

Other changes in details may be made without departing from the spirit or the scope of this invention, but what I claim as new is:

1. A paint scraper comprising a motor driven air blower including a motor casing and an impeller casing, said impeller casing having an air inlet opening and a tangentially extending air outlet head, a downwardly extending manipulating handle carried by the motor and impeller casing, an elongated nozzle carried by said air outlet head and having communication therewith and through which air passes, an electric heating element within said nozzle for heating air passing therethrough, a second manipulating handle structure for the scraper including an L-shaped plate extending across the impeller casing and along said nozzle and terminating in front of said nozzle, means securing the plate to the impeller casing, a U-shaped handle having a hand grip extending above said plate and having one leg secured to the impeller casing and its other leg resting on that portion of the plate disposed above the nozzle, a split clamping ring carried by said last mentioned leg and encircling and gripping said nozzle, and an angularly extending blade carried by the forward end of the plate and disposed in front of said nozzle.

2. A paint scraper as defined in claim 1, and forwardly extending guard fingers carried by said clamping ring and disposed on opposite sides of the nozzle and extending downwardly therefrom for preventing engagement of the nozzle with the surface being scraped.

3. A paint scraper as defined in claim 1, and said blade being adjustable on the forward end of said plate to different angular positions relative to the nozzle.

4. A paint scraper as defined in claim 1 and said handle structure also including brace arms extending downwardly and laterally from said U-shaped handle and a split clamping ring carried by said braces and surrounding and gripping the motor casing.

5. A paint scraping tool comprising an air blower having an outlet head and manipulating handles, a straight nozzle connected with said outlet head and having an outer open end defining an unrestricted outlet, an electric heating element in said nozzle around which the air travels, a supporting plate carried by the nozzle and extending longitudinally thereof and projecting beyond the forward end thereof, and a combination air deflecting and scraper blade carried by the forward end of said supporting plate disposed in front of the open end of the nozzle and in the path of the air stream emanating therefrom and disposed at an angle thereto for directing the air down against the surface being scraped by the blade.

6. A paint scraping tool comprising an air blower having an outlet head and manipulating handles, a straight nozzle connected with said outlet head and having its outer end open defining an unrestricted outlet, an electric heating element in said nozzle around which the air travels, a supporting plate carried by the nozzle and extending longitudinally thereof and terminating slightly in advance of said nozzle, a scraper blade disposed in front of the open end of the nozzle and in the path of the air stream emanating therefrom and disposed at an angle thereto for directing the air against the surface being scraped by said blade, and means adjustably mounting the blade on the forward end of the supporting plate whereby the blade can be moved to different angular positions relative to the nozzle.

References Cited in the file of this patent

UNITED STATES PATENTS

| | | |
|---|---|---|
| 1,589,981 | Moore | June 22, 1926 |
| 1,869,737 | Brever | Aug. 2, 1932 |
| 1,955,240 | Kenney | Apr. 17, 1934 |
| 2,597,215 | Wright et al. | May 20, 1952 |
| 2,609,477 | Borda et al. | Sept. 2, 1952 |
| 2,778,919 | Vicario | Jan. 22, 1957 |

FOREIGN PATENTS

| | | |
|---|---|---|
| 838,304 | Great Britain | June 22, 1960 |